(12) United States Patent
Yamamoto et al.

(10) Patent No.: US 10,410,185 B2
(45) Date of Patent: Sep. 10, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Hiroshi Yamamoto, Yokohama (JP); Kensaku Masuda, Yokohama (JP); Haruko Kawano, Yokohama (JP); Kohei Kaibara, Yokohama (JP); Atsushi Sugiura, Yokohama (JP); Keiichi Hotta, Yokohama (JP); Mika Mishima, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 281 days.

(21) Appl. No.: 15/197,057

(22) Filed: Jun. 29, 2016

(65) Prior Publication Data
US 2017/0185974 A1   Jun. 29, 2017

(30) Foreign Application Priority Data

Dec. 28, 2015   (JP) ................................. 2015-256755

(51) Int. Cl.
*G03G 21/02*   (2006.01)
*G06Q 20/08*   (2012.01)
*G06Q 30/04*   (2012.01)
*G06Q 40/00*   (2012.01)

(52) U.S. Cl.
CPC .......... *G06Q 20/085* (2013.01); *G03G 21/02* (2013.01); *G06Q 30/04* (2013.01); *G06Q 40/12* (2013.12); *G03G 2215/00109* (2013.01)

(58) Field of Classification Search
CPC ....... G06Q 20/085; G06Q 30/04; G03G 21/02
See application file for complete search history.

(56) References Cited

U.S. PATENT DOCUMENTS

| 4,984,170 A | * | 1/1991 | Hirahara | ............ G06Q 20/3433 |
| | | | | 194/209 |
| 5,710,706 A | * | 1/1998 | Markl | .................. G01G 19/005 |
| | | | | 177/25.15 |

(Continued)

FOREIGN PATENT DOCUMENTS

| CN | 1519783 A | 8/2004 |
| CN | 101888464 A | 11/2010 |

(Continued)

OTHER PUBLICATIONS

Jan. 23, 2017 Extended Search Report issued in European Patent Application No. 16182154.1.

(Continued)

*Primary Examiner* — Peter Ludwig
*Assistant Examiner* — Michael Jared Walker
(74) *Attorney, Agent, or Firm* — Oliff PLC (57) ABSTRACT

An information processing apparatus includes a calculation unit that calculates a charge for a service used by a user based on a charge schedule, and a changing unit that, when a period starts, changes the charge schedule from a first charge schedule to a second charge schedule of at least one second charge schedule, and that, when the period ends, changes the charge schedule from the second charge schedule to the first charge schedule.

6 Claims, 7 Drawing Sheets

(56) References Cited

U.S. PATENT DOCUMENTS

| | | | | |
|---|---|---|---|---|
| 5,852,813 | A * | 12/1998 | Guenther | G07B 17/00024 705/408 |
| 6,035,291 | A * | 3/2000 | Thiel | G07B 17/00024 177/25.15 |
| 6,226,626 | B1 * | 5/2001 | Thiel | G07B 17/00362 700/221 |
| 7,236,946 | B2 * | 6/2007 | Bates | G06Q 10/02 705/26.81 |
| 2004/0083188 | A1 * | 4/2004 | Lee | G06Q 10/10 705/400 |
| 2005/0114262 | A1 * | 5/2005 | Howard | G06Q 20/04 705/40 |
| 2006/0139688 | A1 * | 6/2006 | Aoki | G06Q 30/04 358/1.15 |
| 2007/0258112 | A1 * | 11/2007 | Levine | G06Q 10/02 358/448 |
| 2009/0070243 | A1 * | 3/2009 | Buck | G03G 21/02 705/34 |
| 2009/0303525 | A1 * | 12/2009 | Yoshida | G03G 21/02 358/1.15 |
| 2010/0001066 | A1 * | 1/2010 | Matsumoto | G06F 21/608 235/380 |
| 2010/0293547 | A1 | 11/2010 | Hayami | |
| 2011/0076044 | A1 * | 3/2011 | Cho | G03G 21/02 399/79 |
| 2013/0337789 | A1 * | 12/2013 | Johnson | H04W 4/02 455/414.1 |
| 2015/0149923 | A1 * | 5/2015 | Shogaki | G06F 21/608 715/747 |
| 2015/0193846 | A1 * | 7/2015 | Lotze | G06Q 30/0601 705/26.1 |
| 2015/0227953 | A1 * | 8/2015 | Poreh | G06Q 30/06 705/7.35 |
| 2016/0027026 | A1 * | 1/2016 | Matsui | G06Q 30/0202 705/7.31 |

FOREIGN PATENT DOCUMENTS

| | | |
|---|---|---|
| CN | 102930656 A | 2/2013 |
| EP | 2131249 A2 | 12/2009 |
| JP | 2000-352909 A | 12/2000 |
| JP | 2002-091743 A | 3/2002 |
| JP | 2005-208870 A | 8/2005 |
| JP | 2009-292086 A | 12/2009 |

OTHER PUBLICATIONS

Jul. 8, 2019 Office Action issued in Chinese Patent Application No. 201610656698.1.

Jul. 16, 2019 Office Action issued in Japanese Patent Application No. 2015-256755.

Nov. 5, 2018 Office Action issued in Chinese Application No. 201610656698.1.

* cited by examiner

| ITEM | SETTING VALUE |
|---|---|
| USER ID | U3 |
| CHARGE SCHEDULE ID | α |
| ⋮ | ⋮ |

| USER ID | ATTRIBUTION | CHANGE AUTHORITY |
|---|---|---|
| U1 | STUDENT OF A DEPARTMENT | X |
| U2 | STUDENT OF B DEPARTMENT | X |
| U3 | TEACHER | β |
| ⋮ | ⋮ | ⋮ |

| GROUP ID | APPARATUS ID |
|---|---|
| G1 | M11 |
| G1 | M12 |
| ⋮ | ⋮ |
| G2 | M21 |
| ⋮ | ⋮ |

| CHARGE SCHEDULE ID | CHARGE SCHEDULE GROUP |
|---|---|
| α | ... |
| β | ... |
| ⋮ | ⋮ |
| ω | ... |

| ATTRIBUTION | CHARGE |
|---|---|
| STUDENT OF A DEPARTMENT | 10 JPY/SIDE |
| STUDENT OF B DEPARTMENT | 10 JPY/SIDE |
| STUDENT OF C DEPARTMENT | 10 JPY/SIDE |
| TEACHER | FREE |
| OTHER | 30 JPY/SIDE |

FIG. 7B

| ATTRIBUTION | CHARGE |
|---|---|
| STUDENT | FREE |
| TEACHER | FREE |
| OTHER | 30 JPY/SIDE |

FIG. 7C

| ATTRIBUTION | CHARGE |
|---|---|
| STUDENT OF A DEPARTMENT | FREE |
| STUDENT OF B DEPARTMENT | 8 JPY/SIDE |
| STUDENT OF C DEPARTMENT | 10 JPY/SIDE |
| TEACHER | FREE |
| OTHER | 30 JPY/SIDE |

FIG. 7D

| ATTRIBUTION | CHARGE |
|---|---|
| STUDENT OF A DEPARTMENT | FREE |
| STUDENT OF B DEPARTMENT | PROHIBITED |
| STUDENT OF C DEPARTMENT | PROHIBITED |
| TEACHER | FREE |
| OTHER | 30 JPY/SIDE |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under USC 119 from Japanese Patent Application No. 2015-256755, filed on Dec. 28, 2015.

BACKGROUND

Technical Field

The present invention relates to an information processing apparatus, an information processing method, and a non-transitory computer readable medium.

SUMMARY

According to an aspect of the invention, there is provided an information processing apparatus including: a calculation unit that calculates a charge for a service used by a user based on a charge schedule; and a changing unit that, when a period of at least one period starts, changes the charge schedule from a first charge schedule to a second charge schedule of at least one second charge schedule, and that, when the period ends, changes the charge schedule from the second charge schedule to the first charge schedule.

BRIEF DESCRIPTION OF DRAWINGS

Exemplary embodiment(s) of the present invention will be described in detail based on the following figures, wherein.

DETAILED DESCRIPTION

1. Exemplary Embodiment

1-1. Entire Configuration of Image Processing System

Figure 1:
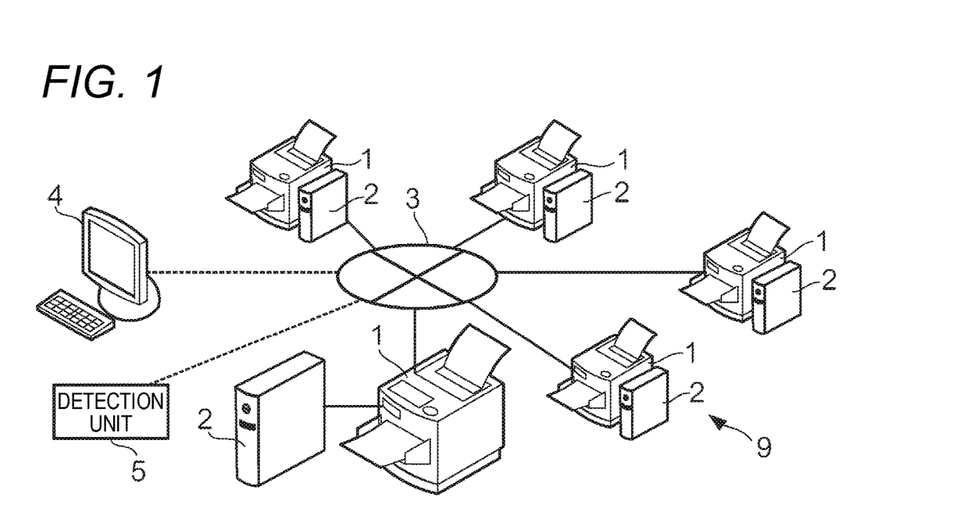
FIG. 1 is a view illustrating an entire configuration of an image processing system 9 according to an exemplary embodiment.

FIG. 1 is a view illustrating an entire configuration of an image processing system 9 according to the exemplary embodiment. As shown in FIG. 1, the image processing system 9 includes plural image processing apparatuses 1 and communication lines 3. The communication line 3 is a public line for relaying communications interacted among the plural image processing apparatuses 1, for example, the Internet. As the communication line 3, a dedicated line may be used other than the public line.

The image processing apparatus 1 is an apparatus for a user to use an image processing unit at a charge in accordance with a using timing and an attribution of the user. The image processing unit executes a process relating to an image (image processing) such as a process forming an image or a process reading an image formed on a medium. The charge for which a user is billed with respect to the process is changed according to the timing of executing (or designating) the process and the attribution of the user.

An account setting machine 2 for billing a charge for the process to be executed in the image processing apparatus 1 is connected to the image processing apparatus 1. The image processing system 9 may include a payment server device for making the payment of the charge by managing a deposit of the user.

The account setting machine 2 is a device that executes a collection of the charge from the user and interacts with information indicating an account status for the image processing apparatus 1. The account setting machine 2 is, for example, a coin mechanism collecting a charge for receiving cash. In addition, the account setting machine 2 may be a magnetic card reader and writer for collecting a charge through a magnetic card, and an integrated circuit (IC) card reader and writer for collecting a charge through an IC card. The image processing apparatus 1 executes a process in accordance with the charge account status of the account setting machine 2.

1-2. Configuration of Image Processing Apparatus (Information Processing Apparatus)

Figure 2:
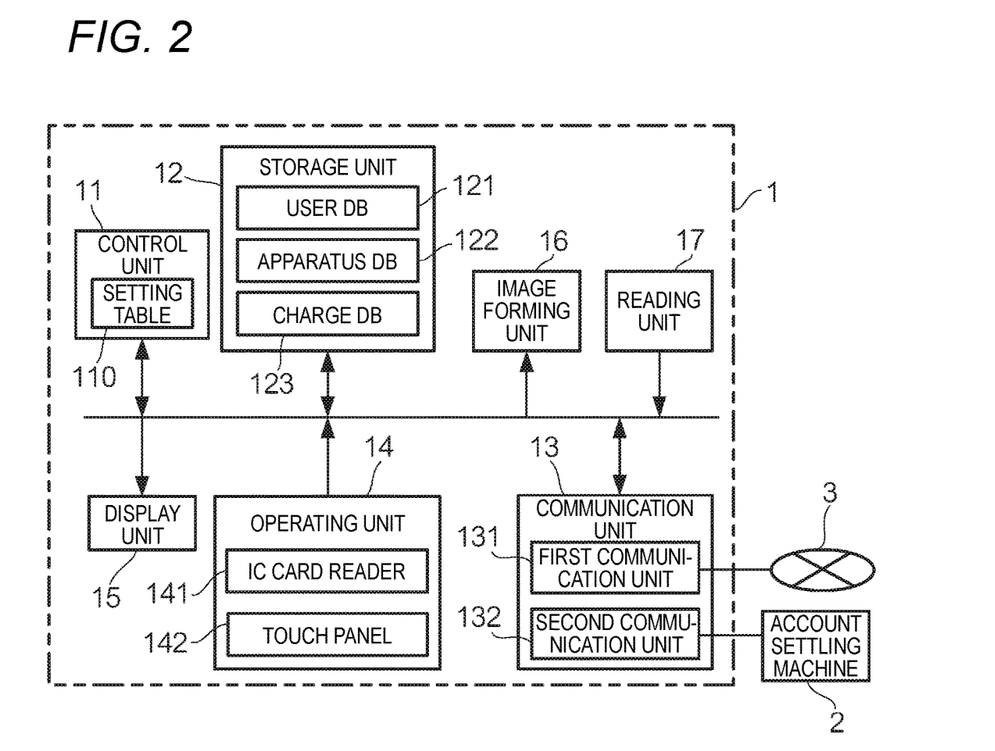
FIG. 2 is a view illustrating a configuration of an image processing apparatus 1.

FIG. 2 is a view illustrating a configuration of an image processing apparatus 1. A control unit 11 has a central processing unit (CPU), a read only memory (ROM), and a random access memory (RAM). The CPU reads and executes a program stored in the ROM or a storage unit 12 to control each unit of the image processing apparatus 1.

Figure 3:
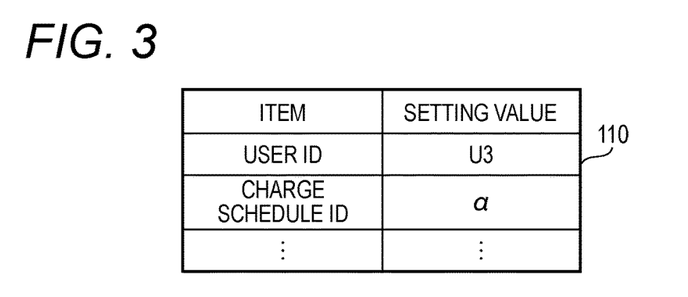
FIG. 3 is a view illustrating an example of a setting table 110.

In addition, a control unit 11 stores a setting table 110 to the RAM. FIG. 3 is a view illustrating an example of the setting table 110. In the setting table 110, setting values are listed for each item that is a setting target. In the setting table 110 shown in FIG. 3, it is shown that a user ID identifying the user that currently uses the image processing apparatus 1 is "U3", and in a case where the user uses a service of the image processing apparatus 1, the service charge is calculated based on a charge schedule "α".

A communication unit 13 includes a first communication unit 131 as an interface that communicates with the other image processing apparatus 1, a terminal 4, a detection unit 5, and the like via the communication line 3 and a second communication unit 132 as an interface that communicates with the account setting machine 2.

The terminal 4 is a terminal device, such as a personal computer, that receives an operation of the user and transmits the operation to the image processing apparatus 1. The detection unit 5 is a sensor that detects the presence of the user. The detection unit 5 has an infrared sensor, an optical sensor, a dynamic sensor, or the like. The detection unit 5 detects the presence of the user when the user enters a room in which the image processing apparatus 1 is installed and detects the absence of the user when the user leaves the room.

The operating unit 14 includes an operating element such as an operation button for instructing various instructions.

The operating unit 14 receives the operation from the user and supplies a signal according to the details of the operation to the control unit 11.

In addition, the operating unit 14 includes, for example, an IC card reader 141 that reads information transmitted from a non-contact IC card based on an ISO/IEC 18092 standard, and a touch panel 142 that detects a position where an instructor such as a finger of the user comes in contact thereto to specify an instruction of the user.

The display unit 15 has a liquid crystal display and displays various information items indicated by the control unit 11. The above-described touch panels 142 are superimposed and arranged on the display unit 15. In this case, the touch panel 142 is configured by a transparent material so that the user can see the image displayed on the liquid crystal display of the display unit 15.

An image forming unit 16 is, for example, an electrophotographic printing apparatus, and forms an image on a medium such as a paper under the control of the control unit 11. The image forming unit 16 is an example of the "image processing unit" providing a service through the image processing with respect to the user.

A reading unit 17 is, for example, an optical scanner device, and reads an image formed on the medium such as paper under the control of the control unit 11. The reading unit 17 is an example of the "image processing unit" providing a service through the image processing with respect to the user.

A storage unit 12 is a high-capacity storage unit such as a hard disk drive, and stores a program that is read by the CPU of the control unit 11. In addition, the storage unit 12 stores a user DB 121, an apparatus DB 122, and a charge DB 123.

Figure 4:
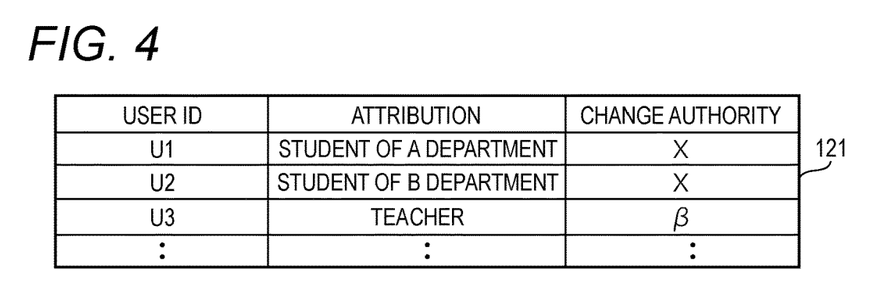
FIG. 4 is a view illustrating an example of a user DB 121.

FIG. 4 is a view illustrating an example of the user DB 121. In the user DB 121, a "user ID" indicating identification information of a user, an "attribution" of the user, and a "change authority" indicating that the user is an "administrator" having an authority for changing a charge schedule or not, and in a case where the user is the administrator, indicating a type of the authority for changing the charge schedule are described in associated with each other. In the user DB 121, authority information items used for certification of the user are described in associated with the user ID.

Figure 5:
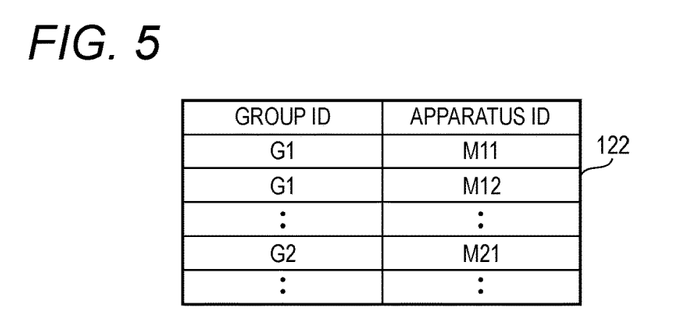
FIG. 5 is a view illustrating an example of an apparatus DB 122.

FIG. 5 is a view illustrating an example of an apparatus DB 122. In the apparatus DB 122, an apparatus ID as identification information allocated to the plural image processing apparatuses 1, respectively and a group ID as identification information of a group to which the image processing apparatus 1, which is identified by the apparatus ID, belongs are described in associated with each other.

Figure 6:
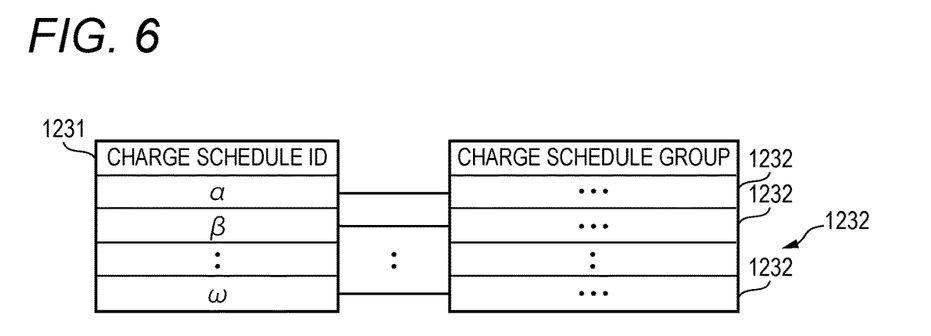
FIG. 6 is a view illustrating an example of a charge DB 123.

FIG. 6 is a view illustrating an example of a charge DB 123. The charge DB 123 is a database storing plural charge schedules that are different from each other. The charge DB 123 includes a charge schedule ID list 1231 in which "charge schedule IDs" as identification information items identifying respective charge schedules, are listed and a charge schedule 1232 to which the respective charging schedule IDs are associated.

FIGS. 7A to 7D are views illustrating examples of a charge schedule 1232. The charge schedule 1232 stores the attribution of the user and the charge to be charged for the user in association with each other. For example, the charge schedule 1232 shown in FIG. 7A sets that a charge "10 JPY/side" is to be charged for all of a "student of an A department", a "student of a B department", and a "student of a C department", a charge with respect to a "teacher" is set for "free", and a charge "30 JPY/side" is to be charged for the "other" user. On the other hand, the charge schedule 1232 shown in FIG. 7B sets a charge with respect to the "student" and the "teacher" for "free".

Figure 7A:
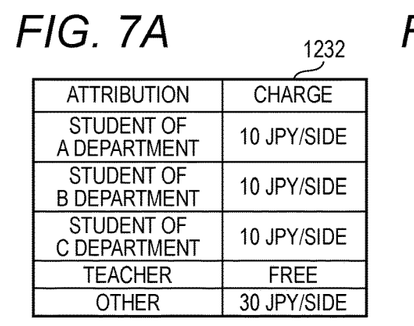
FIGS. 7A to 7D are views illustrating examples of a charge schedule 1232.
Figure 7B:
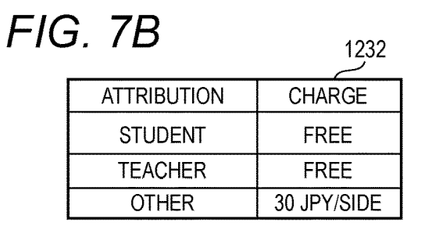
Figure 7C:
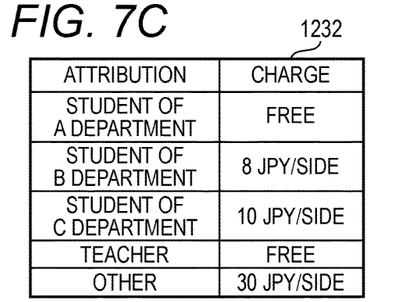
Figure 7D:
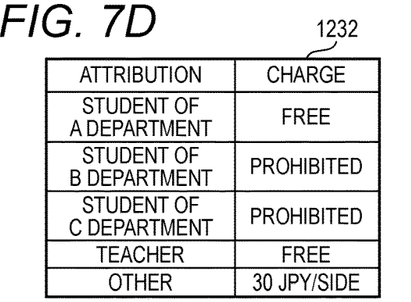

As shown in FIG. 7C, the charge schedule 1232 may set charges differently for the departments, and as shown in FIG. 7D, the charge schedule 1232 may set an indication for prohibiting use of the image processing apparatus without setting a charge according to the attribution.

1-3. Functional Configuration of Image Processing Apparatus

Figure 8:
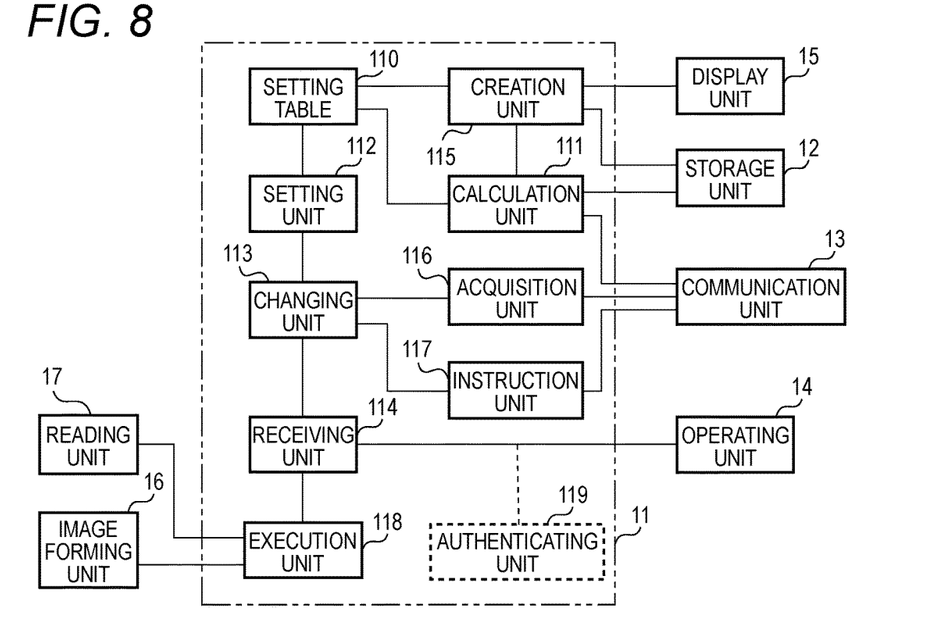
FIG. 8 is a view illustrating a functional configuration of the image processing apparatus 1.

FIG. 8 is a view illustrating a functional configuration of the image processing apparatus 1. The control unit 11 of the image processing apparatus 1 executes a program stored in the storage unit 12, and functions as a calculation unit 111, a setting unit 112, a changing unit 113, a receiving unit 114, a creation unit 115, an acquisition unit 116, an instruction unit 117, and an execution unit 118.

The calculation unit 111 calculates a charge for the service used by the user based on the charge schedule.

The setting unit 112 sets a charge schedule ID in the setting table 110 to a predetermined identification information of the charge schedule as a setting in starting (referred to as a first charge schedule).

In a case where the predetermined period starts, the changing unit 113 changes the charge schedule to be used by the calculation unit 111 from the first charge schedule to the second charge schedule that is different from the first charge schedule. In addition, in a case where the period ends, the changing unit 113 changes the charge schedule from the second charge schedule to the first charge schedule.

The above-described "predetermined period" indicating a timing when the changing unit 113 changes the charge schedule is set linked with the receiving unit 114, the acquisition unit 116, and the instruction unit 117. In the image processing apparatus 1, at least one of these configurations may set the "predetermined period".

The receiving unit 114 receives an operation by the user with respect to the image processing apparatus 1. In addition, the receiving unit 114 receives an instruction changing the charge schedule to the second charge schedule from the user (administrator) having the authority for changing the charge schedule. In this case, said period may start when the receiving unit 114 receives the instruction from the administrator.

The acquisition unit 116 acquires a signal from an external apparatus via the communication unit 13. For example, the acquisition unit 116 acquires a detection signal that is transmitted to the control unit 11 when the detection unit 5 detects the user. In this case, said period may start when the user detected by the detection unit 5 is the administrator.

In addition, the acquisition unit 116 acquires corresponding information in which each of plural periods and the second charge schedules correspond to each other. An example of the corresponding information includes a schedule table in which the charge schedule to be used by the calculation unit 111 is set for each time zone. In this case, when the period described in the acquired corresponding information starts, the changing unit 113 may change the charge schedule ID described in the setting table 110 to the charge schedule ID of the second charge schedule that corresponds to the period in the corresponding information.

The creation unit 115 searches for the user ID described in the setting table 110 among the user DB 121 of the storage unit 12 to specify a change authority that is associated with the user ID. The creation unit 115 creates the different operation screens according to whether the user identified by the user ID is an administrator having the change authority.

When the changing unit 113 changes the charge schedule from the first charge schedule to the second charge schedule, the instruction unit 117 instructs any of the one or more other information processing apparatuses to change the charge schedule through the communication unit 13. The instruction is an instruction for changing the charge schedule from the first charge schedule to the second charge schedule. The instruction unit 117 selects at least one apparatus among the other image processing apparatuses 1 belonging to the common group with the own apparatus itself in reference to the apparatus DB 122, and may give an instruction regarding said change to the selected image processing apparatus 1. In the image processing apparatus 1 that receives the instruction, the changing unit 113 may change the charge schedule set by the setting unit 112 from the first charge schedule to the second charge schedule when the instruction to change the charge schedule is received from other image processing apparatus 1.

The execution unit 118 executes an image processing in accordance with the operation by the user to the image processing apparatus 1 received by the receiving unit 114. For example, the execution unit 118 causes the image forming unit 16 to form an image or causes the reading unit 17 to read an image.

1-4. Operation of Image Processing Apparatus

Figure 9:
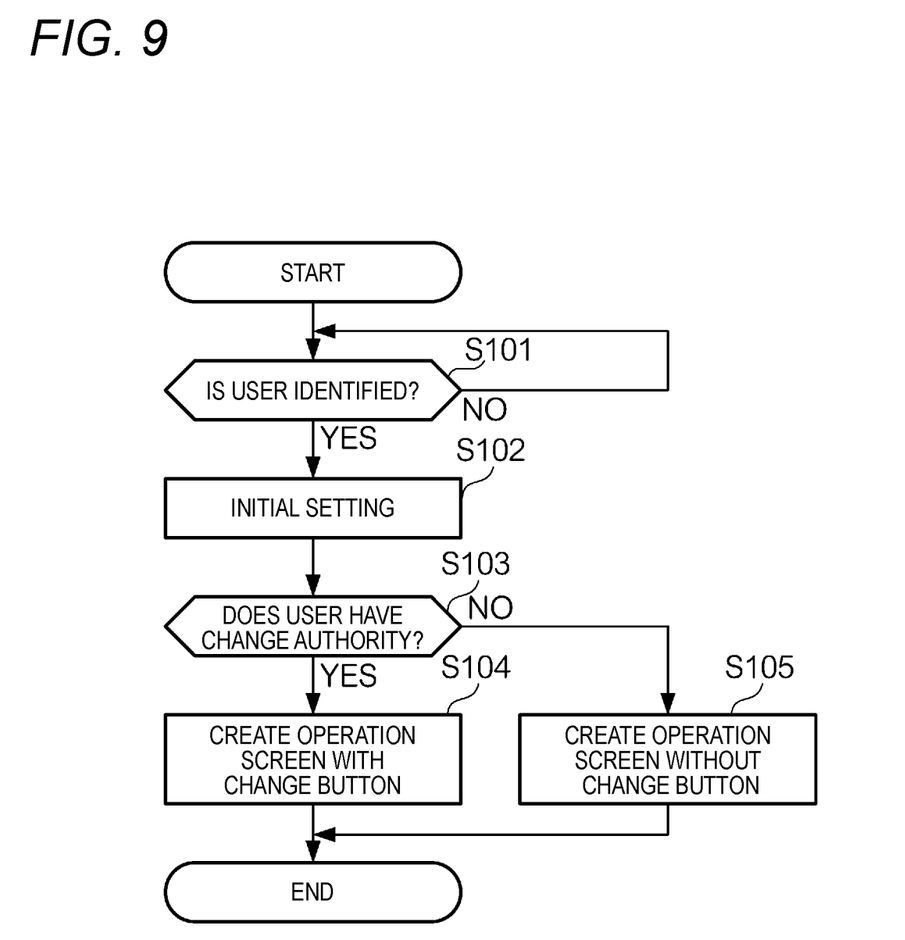
FIG. 9 is a flow chart illustrating an operation for creating an operation screen according to the presence or absence of change authority of a charge schedule.

An operation of the image processing apparatus 1 will be described. FIG. 9 is a flow chart illustrating an operation for creating an operation screen according to the presence or absence of change authority of a charge schedule to the user of the image processing apparatus 1.

When the user passes their own IC card over an IC card reader 141, the operating unit 14 sends the user ID read by the IC card reader 141 to the control unit 11. The control unit 11 of the image processing apparatus 1 determines whether the user is identified by interacting with the operating unit 14 (Step S101).

When receiving the user ID read by the IC card reader 141, the control unit 11 determines that the user is identified by the user ID (Step S101: YES) and the process proceeds to Step S102. When the control unit 11 determines that the user is not identified (Step S101: NO), the control unit 11 continues Step S101.

The control unit 11 sets the received user ID to a setting value with respect to the item "User ID" of the setting table 110, and sets "α" that is a so-called default value to perform an initial setting to the setting value with respect to the item "Charge schedule ID" (Step S102).

The control unit 11 searches for the user ID of the user from the user DB 121 and specifies the change authority of the user to determine whether the user has the change authority (Step S103). In a case where it is determined that the user has the change authority (Step S103: YES), the control unit 11 specifies the charge schedule in which the user has the change authority to create the operation screen with a change button corresponding to the change to the charge schedule (Step S104). In a case where it is determined that the user does not have the change authority (Step S103: NO), the control unit 11 creates the operation screen without the change button (Step S105).

FIGS. 10A to 10D are views illustrating examples of the operating screen displayed on a display unit 15 of the image processing apparatus 1. For example, when the user "U1" that is a student of an A department wants to use the image processing apparatus 1 by passing the IC card over the operating unit 14, since the user "U1" is a student who does not have the authority for change the charge schedule, the control unit 11 determines that the user does not have the change authority in Step S103, and displays the operation screen shown in FIG. 10A on the display unit 15. On the operation screen, buttons for instructing the image processing apparatus 1 to execute services "COPY", "PRINT", and "SCAN" are displayed, but a button for instructing to change the charge schedule is not displayed.

On the other hand, when the user "U3" shown in FIG. 4 passes the IC card over the operating unit 14 for using the image processing apparatus 1, since the user "U3" is a teacher having the authority for changing the charge schedule, the control unit 11 determines that the user has the change authority in Step S103. The control unit 11 displays the operation screen shown in FIG. 10B on the display unit 15. In the operation screen, a button "CHARGE SCHEDULE CHANGE" is displayed in addition to the buttons for instructing to execute the services "COPY", "PRINT", and "SCAN".

Figure 10A:
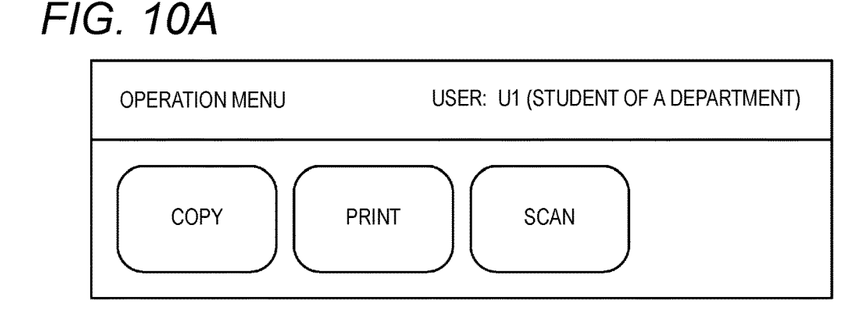
FIGS. 10A to 10D are views illustrating examples of the operating screen displayed on a display unit 15 of the image processing apparatus 1.
Figure 10B:
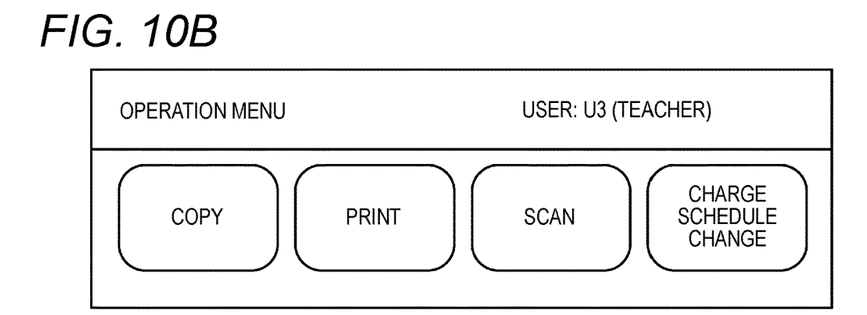
Figure 10C:
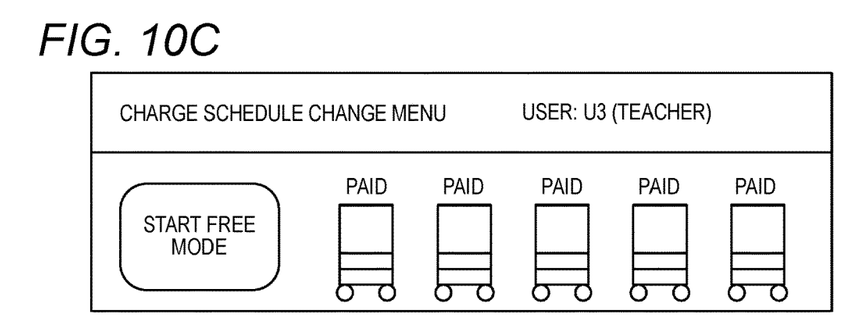

When the user "U3" touches the button, shown in FIG. 10B, on which a character string "CHARGE SCHEDULE CHANGE" is described, the control unit 11 displays the operation screen (referred to as a change screen) for changing the charge schedule that is associated with the user "U3" on the display unit 15. The change screen is, for example, a screen shown in FIG. 10C. When the user "U3" touches the button on which "START FREE MODE" is described on the change screen shown in FIG. 10C, the change screen is switched to a screen shown in FIG. 10D to indicate that the charge schedule is changed. In accordance with the operation of the user "U3", the control unit 11 sets "β" that is the charge schedule ID in which the change authority is given to the user "U3" to the setting value with respect to the item "CHARGE SCHEDULE ID" of the setting table 110. The control unit 11 thus changes the charge schedule that is used in the calculation of the charge to the second charge schedule. In addition, by selecting, for example, by touching plural icons or plural selection buttons (not shown) each of which the character "PAID" is described on for the five image processing apparatuses 1 as illustrated in FIG. 10C, only the charge schedule of the selected image processing apparatus 1 may be changed to the second charge schedule.

Figure 10D:
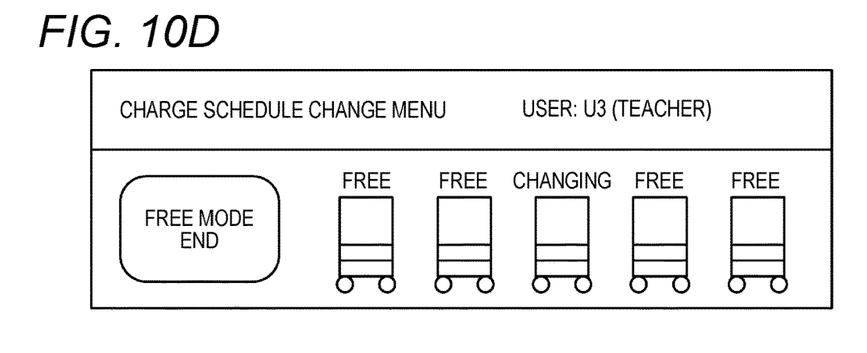

As shown in FIG. 10D, according to the other image processing apparatus 1 belonging to a common group "G1" with the own apparatus, a state where a change of the charge schedule executed on the own apparatus is reflected may be displayed. In the example shown in FIG. 10D, it is illustrated that, among the illustrated five image processing apparatuses 1, only the state of the third apparatus from the left is in "CHANGING", and all of the states of the other apparatuses are changed to "FREE".

Figure 11:
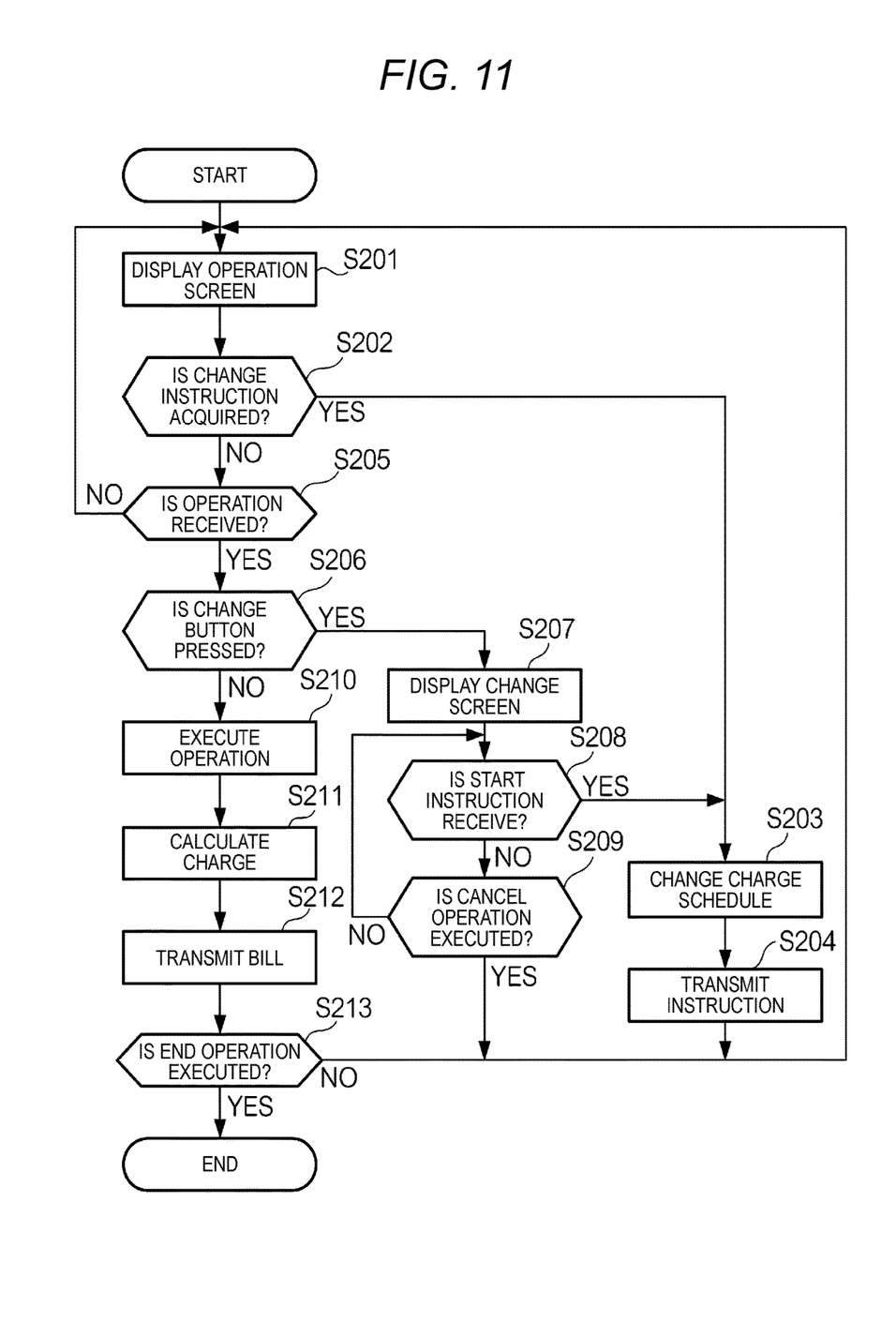
FIG. 11 is a flow chart illustrating an operation for changing the charge schedule of the image processing apparatus 1.

FIG. 11 is a flow chart illustrating an operation for changing the charge schedule of the image processing apparatus 1. The control unit 11 displays the operation screen on the display unit 15 (Step S201), and determines whether the instruction indicating that the charge schedule is changed from the first charge schedule to the second charge schedule is acquired from other image processing apparatuses 1 belonging to the group "G1" to which the own apparatus belongs (Step S202).

In a case where it is determined that the instruction indicating that the charge schedule is changed from the first charge schedule to the second charge schedule is acquired (Step S202: YES), the control unit 11 changes the charge schedule in accordance with the instruction (Step S203). The control unit 11 transmits the instruction indicating that the charge schedule is changed from the first charge schedule to the second charge schedule to any of the image processing apparatuses 1 except for the image processing apparatus 1 that transmits the instruction to the own apparatus, among the other image processing apparatuses 1 belonging to the group "G1" (Step S204).

On the other hand, in a case where it is determined that the instruction indicating that the charge schedule is changed is not acquired (Step S202: NO), the control unit 11 determines whether the operation from the user is received via the operating unit 14 (Step S205). In a case where it is determined that the operation is not received (Step S205: NO), the control unit 11 returns a process to Step S201.

In a case where it is determined that the operation is received (Step S205: YES), the control unit 11 determines whether a change button is pressed (Step S206). In a case where it is determined that the change button is pressed (Step S206: YES), the control unit 11 displays said change screen (Step S207) and determines whether the instruction to start the period is received from the administrator (Step S208). In a case where it is determined that the instruction to start the period is received (Step S208: YES), the control unit 11 changes the charge schedule in accordance with the instruction (Step S203), and transmits the instruction indicating that the charge schedule is changed, to any of the above-described other image processing apparatuses 1 (Step S204).

In a case where it is determined that there is no instruction to start the period (Step S208: NO), the control unit 11 determines whether the operation indicating the cancellation of the operation (cancel operation) is executed (Step S209). In a case where it is determined that the cancel operation is not executed (Step S209: NO), the control unit 11 continues the determination in Step S208. In a case where it is determined that the cancel operation is performed (Step S209: YES), the control unit 11 returns a process to Step S201.

In Step S206, in a case where it is determined that the change button is not pressed (Step S206: NO), the control unit 11 executes a process indicated by the operation received in Step S205 (Step S210) and calculates a charge based on the charge schedule ID, the user ID, and the charge DB 123 (Step S211). A signal of the charge required for billing of the calculated charge is transmitted to the account setting machine 2 (Step S212), and it is determined whether the operation for completing the process by the user (end operation) is executed in the operating unit 14 (Step S213).

In a case where it is determined that the user does not execute the end operation (Step S213: NO), the control unit 11 returns a process to Step S201. On the other hand, in a case where it is determined that the user executes the end operation (Step S213: YES), the control unit 11 ends the process.

According to the configuration, the image processing apparatus 1 calculates the charge according to the period in which the timing when the user uses the service is included. Accordingly, when using the image processing apparatus 1, a charge calculation is performed, for example, a charge is set for free in a case of using a service in a class for which a schooling fee, a practical training fee, or the like has already been paid, and a charge is set for a price in a case of using a service in other time zone.

The period during which the charge schedule is changed starts based on the instruction of the administrator. Accordingly, the intention of the administrator is reflected to the change of the charge schedule. In addition, the period during which the charge schedule is changed starts based on information of the schedule or entering and leaving information of the administrator. Accordingly, the administrator does not need to be aware of the period during which the charge schedule is changed.

2. Modified Examples

Hereinabove, the exemplary embodiment is described, and the details of the exemplary embodiment may be obtained through modifications as follows. In addition, the following modification examples may be combined.

2-1. Modified Example 1

The control unit 11 may function as an authenticating unit 119 indicated by a broken line of FIG. 8. In this case, in the user DB 121, the authentication information of the user that is associated with the user ID and is to be identified by the user ID may be stored.

For example, the IC card reader 141 reads the user ID of the user and the authentication information from the user's IC card. The authenticating unit 119 may perform an authenticating process that confirms whether the above-described user is an identical person by comparing a set of the authentication information and the user ID read by the IC card reader 141 with a set of the authentication information and the user ID described in the user DB 121.

2-2. Modified Example 2

The period during which the charge schedule is changed may end after a predetermined time passes from when the period starts. In this case, the control unit 11 stores the time when the period during which the charge schedule is changed starts to the RAM or the like, manages the current time, and, at the time point after the predetermined time passes from when the period starts, may return the charge schedule to the charge schedule that was set before changing.

2-3. Modified Example 3

In the above-described exemplary embodiment, the control unit 11 calculates the charge based on the charge schedule ID, the user ID, and the charge DB 123 described in the setting table 110. The storage unit 12 may not store the charge DB 123. In this case, the control unit 11 may acquire the charge schedule 1232 corresponding to the charge schedule ID described in the setting table 110, from the service device (not shown) that is connected to the communication line 3, for each time when the charge is calculated.

2-4. Modified Example 4

Figure 12A:
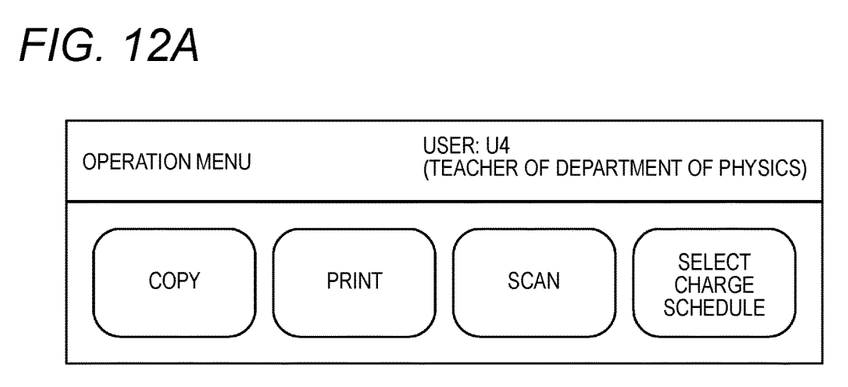
FIGS. 12A to 12C are views illustrating selection screens of the charge schedule.

Two or more charge schedule IDs may be described as the change authority in the user DB 121. In this case, the control unit 11 may display the selection screen that causes the administrator to select the changing charge schedule, on the display unit 15. FIGS. 12A to 12C are views illustrating selection screens of the charge schedule. As shown in FIG. 12A, in the operation screen, a setting button on which "SELECT CHARGE SCHEDULE" is described is displayed to the administrator in which the plural charge schedule IDs are described in the change authority.

Figure 12B:
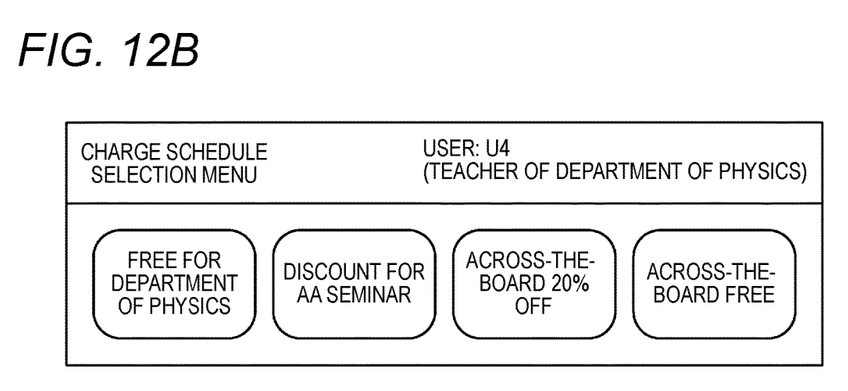

In a case where the administrator touches the setting button, the selection screen shown in FIG. 12B is displayed. In the selection screen, a title "CHARGE SCHEDULE SELECTION MENU" and buttons (selection and instruction buttons) instructing to change plural charge schedules, respectively, are displayed. On the selection screen shown in FIG. 12B, when a user "U4" that is a teacher of the department of physics selects and presses any button among the selection and instruction buttons on which "FREE FOR DEPARTMENT OF PHYSICS", "DISCOUNT FOR AA SEMINAR", "ACROSS-THE-BOARD 20% OFF", and "ACROSS-THE-BOARD FREE" are described respectively, the charge schedule is selected according to the pressed selection and instruction button, and the charge schedule ID of the selected charge schedule is written on the setting table 110.

Figure 12C:
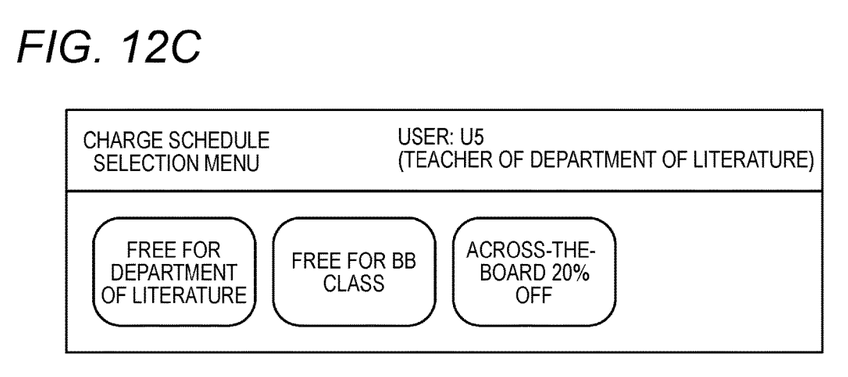

The charge schedule that may be changed by the administrator may set the different charge schedules for each administrator, or may set the different charge schedule for each attribution of the administrators. The common charge schedule may be included in the charge schedule group in which the different charge schedules are set for each administrator or each attribution of the administrators. For example, the selection screen shown in FIG. 12C is displayed on the part of the user "U5" that is a teacher of the department of literature. The special selection and instruction button that permits the teacher of the department of literature to press the button includes two buttons on which "FREE FOR DEPARTMENT OF LITERATURE" and "FREE FOR BB CLASS" are described. The selection and instruction button on which "ACROSS-THE-BOARD 20% OFF" is described is displayed with respect to the teacher of the department of literature and the teacher of the department of physics, respectively.

2-5 Modified Example 5

The image processing apparatus 1 according to above-described exemplary embodiment is the apparatus including an image processing unit such as the image forming unit 16 or the reading unit 17, but may be an information processing apparatus without the image processing unit. In this case, the information processing apparatus may provide a service, that is, image processed to the user by communicating with the image processing units via the communication unit 13 or the like.

In addition, the information processing apparatus may control the processing apparatus that provides a service to the user by executing a process other than the image processing. That is, the processing apparatus controlled by the information processing apparatus is not limited to the image forming unit, and may execute any process under the control of the information processing apparatus.

2-6. Modified Example 6

The administrator according to the above-described exemplary embodiment is included in the users. A person that is an administrator but not a user may manage the image processing apparatus 1. In this case, the image processing apparatus 1 may include a database specifying an administrator separately from the user DB 121.

In addition, in a case where all of the other image processing apparatuses 1 that are capable of connecting with the image processing apparatus 1 via the communication line 3 belong to the common group, the apparatus DB 122 may not include a field of the group ID.

In addition, the charge schedule 1232 describes one charge for each attribution, but may describe different charges for each type of the apparatus (apparatus type). For example, in the charge schedule 1232, the two types of charges "a charge for a low-speed apparatus" and "a charge for a high-speed apparatus" may be associated with each other for each attribution. In this case, the calculation unit 111 specifies the apparatus type of the own apparatus pre-stored in the storage unit 12 or the ROM, and may calculate the charge from the charge field corresponding to the apparatus type. The lower-speed device is a device with a lower process speed when comparing the lower-speed apparatus and the high-speed apparatus. The method for distinguish the apparatus type is not limited to the process speed, and for example, in a case of the image forming apparatus, it may be distinguished by a resolution or a color number of an image to be formed or by a number of the functions such as presence or absence of a inverting function of a paper.

The user DB 121 describes one attribution and one change authority for each user ID, but may describe plural attributions and the change authorities corresponding to the attributions for each user ID. For example, in the user DB 121, the user with the user ID "U1" may be associated with both a combination of the attribution "student of an A department" and the change authority "X" and a combination of the attribution "student of an A department" and the change authority "γ".

In this case, the image processing apparatus 1 may specify the user ID pre-stored in the storage unit 12 or the ROM and a time when the user "U1" passes the IC card over the operating unit 14 for using the image processing apparatus 1 and may determine whether the change authority for the apparatus is present. According to this, it may be set that in a case where the "student of an A department" takes a class as a student, the change authority is not given, but in a case where the "student of an A department" guides lower grade students, the change authority will be given.

2-7. Modified Example 7

For example, when the process is returned from the unexpected abort, the instruction unit 117 may instruct for matching the charge schedule IDs of other image processing apparatuses 1 belonging to the common group that are set respectively. In this case, the acquisition unit 116 may make an inquiry to acquire the charge schedule IDs that are set by other image processing apparatuses 1 as a response with respect to the matching instruction. In a case where it is determined that any of the other image processing apparatuses 1 set the second charge schedule, the changing unit 113 may change the charge schedule from the first charge schedule to the second charge schedule based on the response acquired by the acquisition unit 116.

2-8. Modified Example 8

A program to be executed by the control unit 11 of the image processing apparatus 1 may be provided in a state where the program is stored in a non-transitory computer-readable recording medium such as a magnetic recording medium such as a magnetic tape or a magnetic disk, an optical medium such as an optical disc, a magnetic-optical disc, or a semiconductor memory. In addition, it is also possible to download the program via the Internet or the like. There is a case where various apparatuses may be applied as a control unit that is exemplified by the above-described control unit 11, in addition to the CPU, and for example, a dedicated processor or the like is used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a plurality of image processing apparatuses;
   a plurality of account setting machines;
   a CPU included in the plurality of image processing apparatuses; and
   a memory storing (i) a first charge schedule indicating that a first user is charged a first amount by one of the plurality of account setting machines for a service and (ii) a second charge schedule indicating that the first user and a second user are charged a second amount by one of the plurality of account setting machines for a service, the second user being an administrator who has an authority to switch between the first and second charge schedules, wherein
   the CPU is configured to execute a process, the process comprising:
      creating an operation screen with a change button if a user is determined to be the second user;
      creating an operation screen without the change button if the user is determined to be the first user;
      determining that a period of at least one period starts in response to an operation on the change button by the second user; and
      when the period starts, calculating a charge for a service by the first and second users based on the second charge schedule, and when the period ends, calculating a charge for a service used by the first user based on the first charge schedule.

2. The information processing system according to claim 1, further comprising:
   a sensor that detects the administrator who has the authority to switch between the first and second charge schedules,
   wherein the period starts when the sensor detects the administrator.

3. The information processing system according to claim 1, wherein the process comprises:
   acquiring correspondence information in which a different one of a plurality of second charge schedules corresponds to each different period,
   wherein, in a case where the period starts, the first charge schedule is switched to the second charge schedule that corresponds to the period in the correspondence information.

4. The information processing system according to claim 1, wherein the period ends after a predetermined time passes from when the period starts.

5. The information processing system according to claim 1, further comprising
   a communication line that communicates with the plurality of image processing apparatuses,
   wherein the process comprises:
      instructing the plurality of image processing apparatuses to change the first and second charge schedules through the communication line when switching the first charge schedule to the second charge schedule; and
   switching the first charge schedule to the second charge schedule when an instruction to change the first and second charge schedules is received from at least one of the plurality of image processing apparatuses.

6. The information processing system according to claim 5, wherein the process comprises:
   making an inquiry about the first and second charge schedules used by the plurality of image processing apparatuses, and switching the first charge schedule to the second charge schedule in a case where a response that the second charge schedule is set in all of the plurality of image processing apparatuses is received.

* * * * *